United States Patent [19]
Surles et al.

[11] Patent Number: 5,293,939
[45] Date of Patent: Mar. 15, 1994

[54] FORMATION TREATING METHODS

[75] Inventors: Billy W. Surles, Houston; Philip D. Fader, Katy, both of Tex.

[73] Assignee: Texaco Chemical Company, White Plains, N.Y.

[21] Appl. No.: 922,411

[22] Filed: Jul. 31, 1992

[51] Int. Cl.$^5$ ............................................. E21B 33/138
[52] U.S. Cl. ..................................... 166/295; 166/300
[58] Field of Search ................ 166/299, 300; 523/130, 523/131

[56] References Cited

U.S. PATENT DOCUMENTS

| | | | |
|---|---|---|---|
| 3,391,738 | 7/1968 | Sparlin | 166/295 |
| 4,137,971 | 2/1979 | Shaughnessy et al. | 166/295 |
| 4,275,788 | 6/1981 | Sweatman | 166/295 X |
| 4,842,072 | 6/1989 | Friedman et al. | 166/295 |
| 5,005,648 | 4/1991 | Friedman et al. | 166/295 |
| 5,010,953 | 4/1991 | Friedman et al. | 166/295 X |
| 5,095,987 | 3/1992 | Weaver et al. | 166/295 X |

*Primary Examiner*—George A. Suchfield
*Attorney, Agent, or Firm*—James L. Bailey; Kenneth R. Priem; Jack H. Park

[57] ABSTRACT

Disclosed are methods for treating wells to form a permeable barrier around the well for consolidating unconsolidated mineral particles such as sand in a subterranean petroleum formation penetrated by a well, or for forming an impermeable barrier for fluid entry control, or for plugging the well for abandonment. A fluid containing a polymerizable resin such as furfuryl alcohol oligomer or monomer, a polar organic diluent such as butyl acetate a dense solvent having density greater than the resin density, and an oil soluble acid catalyst to cause polymerization of the resin at formation temperatures is prepared. The dense solvent is bromobutane, bromobenzene, furfural, tetrachloroethane, tetrachloroethylene, tetrabromoethane, 1,2,4 trichlorobenzene and 1,2,3 tribromopropane or mixtures thereof. The amount of dense solvent is selected to ensure that the treating fluid density is greater than the density of the formation fluid, preferably at least 10 greater than the density of the formation fluid.

37 Claims, No Drawings

FORMATION TREATING METHODS

REFERENCE TO COPENDING APPLICATIONS

This application is related to copending application Ser. No. 909,479 filed Jul. 6, 1992 for "FORMATION TREATING METHODS". This application is also related to Pending Application Ser. No. 459,604 filed Jan. 2, 1990, now U.S. Pat. No. 5,040,604 for SAND CONSOLIDATION METHODS.

FIELD OF THE INVENTION

This invention concerns well treating methods including in one important embodiment, a method for treating wells completed in subterranean formations containing unconsolidated particulate matter, e.g. unconsolidated sand, in order to bind the unconsolidated sand grains together in the portions of the formation immediately adjacent to the perforations of the well, and thereby form in this embodiment a stable yet still fluid permeable barrier around the wellbore, in order to facilitate production of fluids from the formation while restraining the movement of sand into the wellbore during the fluid production phase. In another embodiment, this method results in the creation of an essentially impermeable barrier around the wellbore to exclude flow of fluids including water from the formation into the well. In yet another embodiment, the area around the well and in the well are filled with an impermeable mass so the well can be abandoned safely. More particularly, this invention pertains to a method for accomplishing sand consolidation, water exclusion or well plugging in producing oil wells utilizing a single fluid containing a polymerizable resin, an acid catalyst, a hydrolyzable ester and a dense solvent to raise the density of the treating mixture, which permits use of the treating fluid and process in wells containing higher density formation fluid than could be treated using previously disclosed processes.

BACKGROUND OF THE INVENTION

Formation treating for purposes of sand consolidation, water exclusion or well plugging for abandonment are well known terms applying to procedures routinely practiced in the commercial production of petroleum. When wells are completed in petroleum-containing formations which also contain unconsolidated granular mineral material such as sand or gravel, production of fluids from the formation causes the flow of the particulate matter, e.g. sand, into the wellbore, which often leads to any of several difficult and expensive problems. Sometimes a well will "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well. All of these problems are known to exist and many methods have been disclosed in the prior art and applied in oil fields in order to reduce or eliminate production of unconsolidated sand from a petroleum formation during the course of oil production.

Another problem encountered in oil production to which the present process offers an attractive solution is encountered when a well is in fluid communication with a section that includes one or more oil producing intervals and one or more water producing intervals. Production from such a zone results in production of some oil and some water. Since the viscosity of water is less than the viscosity of oil, a much larger volume of water than oil is frequently produced. There are many prior art processes for controlling fluid entry into wells, but none are entirely satisfactory.

Another problem that is frequently encountered in commercial petroleum production operations arises when it is desired to completely plug a well which is to be abandoned. The long term durability of the material used to plug wells for abandonment is of high current interest because of the danger that salt water or petroleum might enter and contaminate fresh water-containing intervals, or otherwise damage the environment.

The above-described production problems and potential solutions to the problems have been the subject of extensive research by the petroleum industry. One general approach suggested in the prior art for consolidating sand to form a fluid permeable zone around the well involves consolidating the porous but unconsolidated sand structure around the wellbore in order to cement the loose sand grains together, thereby forming a permeable mass which will allow production of fluids from the formation into the well but which will restrain the movement of sand particles into the wellbore. Another approach involves removing a portion of the formation around the well and packing specially prepared granular material into the formation around the wellbore which is subsequently caused to be cemented together in a manner which maintains fluid permeability.

It is a primary objective of any successful sand consolidation method that a barrier be formed around the wellbore which restrains the movement of sand particles into the well while offering little or no restriction to the flow of fluids, particularly oil, from the formation into the wellbore where it can be pumped to the surface of the earth. Consolidation only needs to extend into the formation to a depth of 6 to 12 inches around the periphery of the perforations or other openings in the outer casing of the production well.

The objective of a water exclusion of fluid entry control process is to form an impermeable barrier around the well to prevent the flow of sand and formation fluids into the well. A process similar to that used to control sand problems can be used for plugging formation for water exclusion, provided the process is modified to cause creation of an impermeable barrier rather than a permeable barrier.

A very important quality of a satisfactory sand consolidation method, plugging or water exclusion method is durability of the permeable or impermeable barrier formed around the wellbore. Once a permeable barrier for sand control is formed and the well is placed on production, there will be a continuing flow of fluids through the flow channels within the permeable barrier, and it is important that the barrier last for a significant period of time, e.g. several months and preferably years, without excessive abrasive wear or other deterioration of the consolidation matrix which would cause the particulate matter to flow once again into the wellbore. Similarly, it is important that impermeable barriers formed for fluid entry control, or for preparing a well for abandonment, be long lasting.

It is also important that the material injected into the formation for all of our formation treating methods described above should be essentially unreactive during the period it is inside the wellbore, i.e. while it is being pumped down the well and positioned where it is desired adjacent to the perforations of the production casing.

The processes employing the furfuryl alcohol oligomer or monomer have been used with consistently high success rates in many field applications. It has been noted, however, that the fluid density of the treating fluid, which is about 9.75 pounds per gallon, makes the process difficult to apply when the formation fluid density is equal to or greater than 9.75 pounds per gallon. There is, therefore, an unsatisfied need for a treating fluid and process which can be used to treat formations containing fluids greater than 9.75 pounds per gallon.

PRIOR ART

Many processes and materials have been utilized for treating formations for consolidating sand in the formation adjacent to production of wellbores or to plug wells to control fluid entry into the well or to prepare the well for to abandonment. One of the more successful agents utilized for this purpose is furfuryl alcohol resin which can be polymerized to form a solid matrix which binds the sand grains together, while at the same time offering superior resistance to high temperatures and to caustic substances which may be encountered in steam flood operations. One of the problems in utilizing furfuryl alcohol resin to polymerize in the formation is in accomplishing uniform catalysis of the polymerization. Many catalysts that are effective for polymerizing furfuryl alcohol resins cannot be admixed with the furfuryl alcohol to permit employing a single fluid containing both the resin and the catalyst to be injected into the formation, because the time of polymerization is so short or unpredictable that there is excessive danger that the resin will polymerize in the injection wellbore.

In U.S. Pat. No. 4,427,069 there is disclosed a procedure for consolidating sand in a formation adjacent to a wellbore using an oligomer of furfuryl alcohol, in which the catalyst used is a water soluble acidic salt, preferably zirconyl chloride, which is injected in an aqueous solution into the formation prior to the resin containing fluid injection. The salt absorbs on the sand grains, and sufficient acidic salt remains adsorbed on the sand grain during the subsequent resin fluid injection stage that adequate polymerization occurs. Although this has been effective in many difficult situations where sand consolidation procedures are utilized, specifically in connection with thermal flooding such as steam injection procedures, the procedure nevertheless requires a multi-fluid injection procedure which requires more time and is more expensive than is desired. Usually a preliminary sand cleaning step is required before injecting the aqueous-catalyst solution in order to remove the naturally-occurring oil film from the sand grains to ensure good catalyst adsorption on the sand. Also, although catalyst mixes with the subsequently injected polymer to a limited degree, usually sufficient to cause some polymerization, it is believed that improved performance would result if the catalyst resin mixture can be made more homogenous prior to polymerization, in order to achieve a dense strong durable consolidation mass.

In U.S. Pat. No. 4,842,072 for "SAND CONSOLIDATION" we disclosed a particularly effective method for consolidating sand utilizing a mixture of a polymerizable resin such as an oligomer of furfuryl alcohol and a diluent such as butyl acetate and an oil soluble, slightly water soluble acid catalyst such as orthonitrobenzoic acid which is injected followed by injection of salt water to reestablish permeability.

In U.S. Pat. No. 4,903,770 for "SAND CONSOLIDATION" we disclosed a preferred process which is more easily removed after a period of use and which is quite inexpensive. The process employs a fluid comprising a polymerizable monomer such as furfuryl alcohol and as a diluent, a polar organic solvent such as methanol and a strong, non-volatile acid catalyst such as sulfuric acid, mixed with steam to form a multiphase or aerosol treating fluid, and injected into the formation to be consolidated. An ester such as ethyl or butyl acetate is incorporated in the fluid when the steam quality is less than 80 percent.

In U.S. Pat. No. 4,669,543 which issued Jun. 2, 1987, there is described a method for consolidating sand using an acid-curable resin and utilizing as a catalyst, the reaction product of an acid, and an alkyl metal or ammonia molybdate. In that instance, the catalyst is incorporated in an aqueous carrier fluid which comprises the continuous phase of an emulsion in which the polymerizable resin is the dispersed or discontinuous phase. Thus this process requires that the emulsion be resolved or broken after it is located in the portion of the formation where the permeable consolidating mass is desired, which is difficult to achieve to the high degree of completion necessary to accomplish the desired strong durable consolidating matrix necessary for a long lasting sand consolidation process.

U.S. Pat. No. 5,010,953 which issued Apr. 30, 1991 teaches a sand consolidating process using a polymerizable compound such as furfuryl alcohol, a diluent such as a low molecular weight alcohol, an acid catalyst and an ester and as an additive to reduce shrinkage, a copolymer of starch and a synthetic polymer such as acrylamide or acrylate.

U.S. Pat. No. 5,005,647 which issued Apr. 9, 1991, discloses a process for shutting off permeable zones in wellbores to reduce excess water flow using fluids similar to that described in U.S. Pat. No. 5,010,953 discussed above.

U.S. Pat. No. 5,005,648 which issued Apr. 5, 1991 describes a method of treating permeable zones in a formation to reduce water flow into a well completed therein by injecting a fluid-containing polymerizable compound, an ester, and an acid catalyst such as orthonitrobenzoic acid or toluenesulfonic acid.

U.S. Pat. No. 4,938,287 which issued Jul. 3, 1990 describes a process in which a preflush such as ethyl or butyl acetate is injected into the sand to be consolidated to remove oily residue, followed by injecting the treating fluid containing the polymerizable resin, diluent, ester and acid catalyst to accomplish sand consolidation.

The above processes have been extremely successful in treating wells in many formations, including formations where the temperature spans a wide temperature range. When the process is applied to formation whose fluids are denser than 9.75 pounds per gallon, it has been difficult to utilize the prior art furfuryl alcohol oligomer processes. Thus there is still an unfulfilled need for a well treating method for sand consolidation, fluid exclusion or plugging wells prior to abandonment applicable to formations whose fluid density is 9.75 pounds per gallon, or greater.

SUMMARY OF THE INVENTION

We have discovered methods for treating formations for consolidating sand or for forming a fluid-excluding impermeable barrier in formations over a broad temperature range when the formation fluid density exceeds 9.75 pounds per gallon. A treating fluid comprising a polymerizable resin, preferably a derivative such as an oligomer of furfuryl alcohol, a hydrolyzable ester such as ethyl or butyl acetate to absorb water to shift the polymerization reaction to completion, and a solvent whose density is greater than 12 and preferably greater than 15.4 pounds per gallon, and an oil soluble internal catalyst which can safely be mixed with the resin on the surface, is formulated on the surface. This treating fluid is injected into the well and in one embodiment, into the surrounding unconsolidated sand. The catalyst action is critical to the success of our process, since this process is applied to formations whose temperature may be less than 350° F. The pK or negative of the log of the ionization constant of the acid catalyst must be chosen carefully to produce a set time in the range of 0.75 to 4 hours and preferably from 1-2 hours at the formation temperature. The preferred acid for our process varies with the temperature of the formation being treated. The concentration of the acid in the treating fluid must also be selected carefully to ensure the set time is from 0.75 to 4.0 and preferably from 1.0 to 2.0 hours. The dense solvent for use in our process is preferably bromobutane, bromobenzene, furfural, or tetrachloroethane. The amount of dense solvent employed is sufficient to raise the density of the treating fluid to a value greater than the density of the formation fluid, preferably at least 10 percent greater than the formation fluid. Our preferred hydrolyzable organic diluent is butyl acetate. In preparing the fluid, a mixture of butyl acetate, dense solvent and toluenesulfonic acid is formed and to that mixture is added from 30 to 80 percent and preferably about 60 percent to 75 percent resin, e.g. the furfuryl alcohol oligomer. This homogenous organic fluid can then be injected via the injection string into the formation without danger of premature polymerization. The injected mixture of resin, dense solvent, hydrolyzable ester and acid catalyst, being oil soluble, simultaneously removes and displaces undesired oil and other oil soluble material coating the sand grains, and ensures a thorough contact between the sand grains and the resin-catalyst mixture. When this well treating process is being applied for sand consolidation, the next step is injection of an aqueous saline solution which is from 70 to 100 saturated with inorganic salt, preferably sodium chloride, into the resin-saturated zone of the formation. This injection step accomplishes an opening of flow channels within the void spaces in the formation into which the resin catalyst mixture had been injected without removing the polymerizable resin, an event which would occur with <70 salt solution, which is important to ensure that the resulting polymerized resin bonded sand matrix is sufficiently permeable to permit flow of formation fluids from the formation after the sand consolidation process is completed. The salt water also modifies the resin coating on the sand, removing water therefrom, which increases the strength and durability of the polymerized resin matrix. The brine post-flush is not used when an impermeable barrier is desired for fluid entry control or for preparing a well for abandonment. The well is then shut in for a period of from 0.75 to 4.0 hours and preferably from 1-2 hours. This two-step procedure results in the formation of a permeable, consolidated sand mass around the perforations of the wellbore which restrains the movement of sand into the wellbore during production operations, while permitting relatively free flow of formation fluids, particularly formation petroleum, into the wellbore.

When our well treating process is applied for the purpose of plugging zones to prevent undesired fluid entry into the well, or to plug a well prior to abandonment, essentially the same polymer, dense solvent, ester and acid catalyst is injected in essentially the same manner, but the salt water injection step is not used.

DETAILED DESCRIPTION OF THE PREFERRED EMBODIMENTS

We have discovered, and this constitutes our invention, that it is possible to accomplish an improved well treating process such as sand consolidation method, water exclusion or well plugging utilizing the sand naturally occurring in the formation, even where formation fluids having densities greater than 8.5 pounds per gallon are present. The process employs a single treating fluid injection step, plus in some embodiments a brine injection step. A mixture of polymerizable resin, having dissolved or dispersed therein a hydrolyzable ester and the catalyst for the polymerization step, and a dense solvent is prepared and injected into the formation to saturate the void space in the portion of the formation adjacent to the production well. This accomplishes coating the formation granular material, e.g. the formation sand, with the mixture of polymerizable resin and catalyst. Since the fluid injected into the formation in this step is organic and contains a diluent, the minor amounts of formation petroleum and other oil-based materials coating and contaminating the surface of the sand grains is effectively removed or dissolved. It is a particular feature of this method that a separate preliminary wash step to remove materials coating the sand grains is not required. We have conducted laboratory tests, using formation sand containing crude oil, to which additional oil was deliberately added, and we still obtained successful consolidation by this method without any preliminary wash step.

In another embodiment of our well treating process, the same fluid is injected to coat the formation granular material and to fill the void spaces between the grains completely, to form an impermeable mass which restricts fluid movement into or out of the well.

The discovery that constitutes our invention involves addition of a dense solvent to the treating fluid. By dense solvent we mean any effective solvent for the furan resin which has a density greater than the density of the furan resin which is about 9.16 pounds per gallon. The dense solvent should dissolve the resin and the acid and be insoluble in water. Examples of preferred dense solvents are given below, together with the density of each solvent.

TABLE I

| SOLVENT | DENSITY, POUNDS/GALLON |
| --- | --- |
| Bromobutane | 10.66 |
| Bromobenzene | 12.5 |
| Furfural | 9.58 |
| Tetrachloroethane | 13.2 |
| Tetrachloroethylene | 13.3 |
| Tetrabromoethane | 24.7 |

TABLE I-continued

| SOLVENT | DENSITY, POUNDS/GALLON |
|---|---|
| 1,2,4 Trichlorobenzene | 12.2 |
| 1,2,3 Tribromopropane | 20.2 |

It is desired that the mixture of dense solvent, furan resin and acid catalyst have a density of at least 10.0 pounds per gallon, and it is especially desirable that the density of the mixture be made greater than the density the formation fluid where the treating fluid will be used. When choosing a dense solvent, it is recommended that the dense solvents be used when the formation fluid density deviates greatly from about 10.0. The following table gives the especially preferred dense solvent for use in formations having fluid densities in the given range.

TABLE I

| Formation Fluid Density Pounds Per Gallon | Preferred Dense Solvent |
|---|---|
| 9.50 to 10. | Bromobutane |
| 10 to 11.5 | Bromobenzene |
| 11.5 to 12 | Tetrachloroethane |
| 12 to 19 | 1,2,3 Tribromobenzene |
| 19.0 to 19.0+ | Tetrabromoethane |

Although it is possible to use solvents of lesser densities where very high density formation fluids are encountered, such large quantities of solvent are required that the amount of polymerizable resin present is reduced, which might reduce the ultimate strength of the polymerized resin treated zone.

The amount of dense solvent required should be determined by the resultant viscosity of the treating fluid comprising resin, ester, acid catalyst and dense solvent. It is important that the viscosity of the treating fluid be from 1 to 1,000 and preferably from 20 to 400 centipoise Generally this desired viscosity will be achieved if the amount of the preferred dense solvent from Table II is from 5 to 40 and preferably from 10 to 20 by volume.

Our original reason for modifying the treating fluid by adding dense solvent was to raise the density of the fluid. We have discovered that the dense treating fluid exhibits other unexpected advantages. The dense solvents are powerful solvents for furan and the resulting treating fluid exhibits improved flow properties while still maintaining a relatively high resin content, which results in more complete saturation of the sand during treating fluid injection, producing a stronger and more uniform treated zone. This observation applies whether the treating fluid is used in the embodiment for sand consolidation, fluid entry control, or total well plugging for treating wells prior to abandonment.

The resin which we have found to be especially preferable for use in our well treating process is a furfuryl alcohol oligomer. Any resin which will polymerize upon exposure to heat and contact with an acid catalyst can be used in this process; however, furfuryl alcohol oligomer $(C_4H_3OCHO)_n$ is the particularly preferred polymerizable resin. This resin has the advantage of being relatively inexpensive and having the characteristic of autopolymerizing on exposure to acid catalyst, forming a thermal-setting resin which cures to an insoluble mass that is highly resistant to chemical attack as well as to thermal degradation. The particularly preferred commercial form in which this resin is available is "QUACORR 1300 ®" marketed by QO Chemicals.

This resin is ordinarily obtained commercially in a form containing 90 to 95 furfuryl alcohol oligomer.

It is essential for this procedure that the acid catalyst utilized be oil soluble so that it may be incorporated in the resin solvent solution. This permits thorough mixing of the catalyst which is essential in order to ensure that the polymerization reaction occurs uniformly throughout the entire mass of well treating chemical placed in the formation. Prior art methods which utilize a catalyst injected in a non-miscible fluid either before or after injection of the fluid containing the polymerizable resin, or present in a non-miscible phase of an emulsion polymer fluid, do not accomplish uniform reactions such as are possible by use of the present soluble catalyst. The catalyst for use in our invention must also be one which exhibits temperature sensitivity such that the catalytic polymerization does not occur during the time that the fluid is prepared and mixed on the surface of the earth or pumped into the formation. It is equally important that once the fluid is placed in the formation and left in a quiescent state for a period of time sufficient to ensure temperature equalization with the formation, that the polymerization reaction occur rapidly in order to permit completion of the procedure in a relatively brief period of time, so the well can be put on production as soon as possible. Because of this dual requirement, the catalyst choice and concentration are both critical to the proper function of our invention.

As stated above, the preferred catalyst for use in our process is one which is oil soluble and very slightly water soluble. While we have previously disclosed that the preferred organic acid catalyst is orthonitrobenzoic acid for processes being applied to relatively high temperature (e.g., greater than 350° F.) formations, we have found that at temperatures less than 350° F. and especially when the formation temperature is below 300° F., orthonitrobenzoic acid is so weak and so insoluble that the time required for polymerization to proceed at least sufficiently far that no displacement of polymer from the sand grain occurs, is in the range of several days to a week or more. This long set time causes several problems. The polymerizable compound, e.g. the furfuryl alcohol, may be washed off the sand grains before polymerization proceeds far enough to render the polymer immobile, which greatly weakens the strength of the polymerized mass. Also, the total cost of a well treatment is greatly increased by the extended period which the well is shut in, which delays returning the well to production.

We have found that the desired set time of from 0.75 to 4.0 and preferably from 1–2 hours can be realized for any particular formation temperature in the range of 60° F. to greater than 350° F. and especially from 100° to 350° F. if the pK of the acid catalyst and the concentration of the acid catalyst are carefully selected.

The pK of an organic acid is defined as the negative of the log of the ionization constant of the acid and is essentially an inverse scale measure of the strength of the acid, e.g. strong acids have lower pK values. The acid catalyst for this process is preferably an organic acid which is oil soluble and which has a pK in the range of 0.4 to >6.0. There is an especially preferred acid for our process for each of several temperature ranges. For example, if the temperature is from 60° F. to 180° F., the acid pK should be from 0.4 to 0.8 and the especially preferred catalyst is toluenesulfonic acid, usually p-toluenesulfonic acid, although mixed isomers may also be used. In this range, hydrochloric acid, nitric acid and sulfuric acid are also preferred acids. Mixtures of toluenesulfonic acid with the above may also be used. For convenience, a mixture comprising 95 toluenesulfonic acid with 5 xylenesulfonic acid has been used in the field because the mixture is liquid at field surface conditions and therefore easier to mix with the other fluids in preparing the treating fluid. This is a commercial product available under the trade name "WITCAT TX ACID ®" from Witco Chemical Company. Other mixtures may also be used, to ensure that the melting point is below ambient temperature.

When the temperature of the portion of the formation being treated is from 180° F. to 250° F., the acid pK should be from 0.8 to 2.1 and the especially preferred acid is oxalic acid. Other preferred acids for this temperature range are iodic acid, maleic acid, dichloroacetic acid and trichloroacetic acid.

When the temperature range is from 250° F. to 350° F., the pK should be 2.1 to 4.2 and the especially preferred acid is 0-nitrobenzoic acid. Other preferred acids are chloroacetic acid and phosphoric acid.

When the temperature exceeds 350° F., the acid pK should be greater than 4.2 and the especially preferred acids are acetic acid, benzoic acid and adipic acid.

Once the acid has been selected, the acid concentration should be determined. The concentration of a particular acid to yield the desired 0.75–4.0 hour set time is solely determined by the formation temperature. It is essential in applying our process to a formation that the temperature of the formation be known or measured. The following table gives the relationship between toluenesulfonic acid catalyst and temperature to produce set time within the preferred 1–2 hour range.

TABLE III

| FORMATION TEMPERATURE °F. | % TOLUENE-SULFONIC ACID |
|---|---|
| Up to 80° F. | 5.0–3.8 |
| 80–120° F. | 3.8–3.1 |
| 120–140° F. | 3.1–2.4 |
| 140–200° F. | 2.4–1.4 |
| 200–230° F. | 1.4–0.8 |
| 230–260° F. | 0.8–0.5 |
| 260–300° F. | 0.5–0.3 |

As can be seen from Table III, it is possible to use toluenesulfonic acid over a broader temperature range than the 60° F.–180° F. range for which this acid is the preferred catalyst; however, it is preferred that a weaker acid be employed in the 180° F. to 300° F. range for optimum results and to reduce the sensitivity of the treating fluid to small errors in acid concentration.

Table IV below gives the concentrations of oxalic acid which results in reaction times in the desired range.

TABLE IV

| FORMATION TEMPERATURE °F. | CONCENTRATIONS OF OXALIC ACID Wt. % |
|---|---|
| 180–200 | 5.0–4.0 |
| 200–220 | 4.0–3.0 |
| 220–240 | 3.0–2.0 |
| 240–260 | 2.0–1.0 |

In Table V, the concentration of o-nitrobenzoic acid which produces reaction times in the desired range are given:

TABLE V

| FORMATION TEMPERATURE °F. | CONCENTRATIONS OF O-NITROBENZOIC ACID WT. % |
|---|---|
| 250–270 | 2.5–1.8 |
| 270–290 | 1.8–1.4 |
| 290–310 | 1.4–0.8 |
| 310–330 | 0.8–0.5 |
| 330–350 | 0.5–0.3 |

In Table VI below, the concentrations of benzoic acid to yield reaction times the desired range are given.

TABLE VI

| FORMATION TEMPERATURE °F. | CONCENTRATIONS OF BENZOIC ACID WT. % |
|---|---|
| 350–400 | 4.0–3.0 |
| 400–450 | 3.0–2.0 |

One preferred method for forming a particularly effective fluid for use in practicing the well treating process of our invention involves mixing the resin in its commercial form, which is usually an emulsion, with a mixture of the ester and the desired dense solvent, after which the acid such as toluenesulfonic acid catalyst is dissolved in this mixture of resin and ester. A typical optimum blend would employ from 60 to 80 percent resin, 5 to 15 percent dense solvent, 5–15 percent ester, 1–2 percent methanol and 1–2 percent acid.

The melting points of many of our preferred acids are above surface ambient temperatures. For example, the melting point of toluenesulfonic acid is 223° F., so it is necessary to incorporate the acid in a suitable diluent, usually a low carbon alcohol such as methanol, to facilitate mixing it with the resin emulsion. From 1 to 2 methanol is usually adequate for this purpose. This procedure may be used with equal success whether the fluids described above are being used for sand consolidation, when the well treatment is being used to shut off undesired water flow, or when the fluids are injected to plug a well completely, such as when the well is being prepared for abandonment.

The quantity of the fluid comprising the resin, dense solvent and catalyst injected into the formation varies depending on the purpose to be served by the treatment, e.g. sand consolidation, fluid entry prevention or complete well plugging for abandonment. The volume also varies with the thickness and porosity of the formation to which the well treating process is to be applied, as well as the diameter of the well and the desired thickness of the treated zone in the formation. The thickness and porosity of the formation and the diameter of the well will always be known, and it is ordinarily satisfactory if depth of the penetration is in the range of from 6 to 12 inches from the well bore. As an example, if it is desired to treat a formation whose thickness is 18 feet and porosity is 35 to form a permeable barrier for sand control just outside the perforations of the wellbore which is 8 inches (0.67 ft.) thick, and the well being treated is 10 inches in diameter (radius=5 in.=0.42 ft), then the volume of fluid necessary is calculated according to the example below.

$$(\pi(.42 + .67)^2 - \pi(.42)^2)(18)(.035) = (1.188\pi - .1764\pi)(18)(.35)$$
$$= 20.02 \text{ Cu. Ft.}$$
$$= 149.8 \text{ Gallons}$$

About the same volume of salt water is used to create the permeable treated zone when the well treating method is being used for sand control.

About the same volume of resin-containing fluid will be required to treat an otherwise identical well to form a fluid 15 impermeable barrier around the well for the purpose of reducing or preventing flow of fluid into the well. No salt water injection is used in this embodiment.

When a well is to be plugged completely as a step in preparation for abandonment, a greater volume of fluid will be required, it is necessary to treat a portion of the permeable formation outside the well perforations as above, and also to fill all or a major portion of the inside of the well casing or tubing, or of an open hole. In this case, the volume of fluid required for the same well described above is the amount shown in the above example plus enough to fill the inside of the well for 18 feet. The amount required is:

$$20.02 \text{ Cu. Ft} + \pi(.4166)^2(18) = 20.02 + 9.78$$
$$= 29.8 \text{ Cu. Ft.}$$
$$= 222.93 \text{ Gallons}$$

No salt water injection is used in this embodiment.

After the above described quantity of fluid comprising resin, catalyst, ester and dense solvent are injected into the formation, a second step is needed when our process is being used to form a permeable barrier for sand control. The polymerizable resin must be displaced from the injection string to avoid the possiblility that the resin might polymerize in the wellbore. Also, the fluid injected into the formation occupies essentially all of the void space of the formation, e.g. the volume other than the sand grains themselves in the portion of the formation contacted by the fluid. If this injected fluid polymerized without injecting any second fluid to displace a portion of the resin material from the void spaces of the formation, the resultant barrier would be strong and resistant to chemical attack but it would not be permeable and so would not permit flow of fluid through the formation into the wellbore. For this embodiment, some post-flush fluid must be used to reestablish fluid permeability in the treated zone.

The polymerizable resin used to prepare the sand consolidation matrix is normally available commercially as a mixture containing about 5 water. Additional water is formed by the condensation polymerization reaction. The strength of the sand consolidating polymer matrix will be increased if at least a portion of this water is removed before the resin polymerizes. We have found that the desired objective of displacing resin from the void spaces in the treated zone for developing permeability within the sand consolidated mass and dewatering the polymer-containing fluid is best accomplished by injecting brine or water containing an inorganic salt, preferably sodium chloride, into the string to pass through the portion of the formation occupied by the resin fluid. The salinity of water utilized in this post flush treatment is quite important. The surface of the resin-coated sand grains should be dewatered in order to aid in the polymerization reaction and also in order to produce a denser stronger matrix cementing the sand grains together. Fresh water or water containing less than 70 salt does not accomplish the drying action necessary to produce the desired strength in the permeable barrier. The desired results will only be achieved if the second fluid injected into the formation is at least 70 saturated with respect to the inorganic salt. It is preferably at least 80 saturated with salt. Our particular preferred embodiment uses essentially saturated brine, specifically water saturated with sodium chloride at the conditions of injection. By using at least 70 saturated brine, the desired development of permeability is achieved without displacing any of the resin from the sand grains and dehydration of the resin necessary for the polymerization reaction to occur in the time and to the extent desired for optimum polymerization is also realized. In practice, the brine usually is not totally effective at displacing set polymer from the inside of the injection string. It is usually necessary to drill out any residual polymer before placing the well back on production.

As a practical matter, the brine utilized will probably be water containing mainly sodium chloride because of the cost and availability of sodium chloride in the field. This is a particularly preferred brine for our purpose. We have discovered that potassium chloride does not work well in this application, and so the fluid injected into the formation after the polymerization fluid has been injected should not contain appreciable quantities of potassium chloride. The quantity of brine injected into the formation for sand consolidation should be sufficient to displace as much as possible of the residual resin fluid from the injection string, and also sufficient to pass through the resin saturated portion of the formation. It is generally sufficient if about the same volume of brine as the polymerization fluid is utilized, and the rate at which it is injected is not particularly critical for our purposes.

When our well treatment process is used to form an impermeable barrier for fluid entry prevention, e.g. to reduce flow of water into the well, the brine injection step is not used. Although enough brine could be injected to flush all of the resin from the well interior, this is difficult to control. We have found it preferable to leave the resin-containing fluid in the well until it has set, and then drill out the well to remove the set resin to a point at least as deep as the bottom perforation from which production is taken. In some cases, the well is drilled out for a distance from 10 to 50 feet below the lowest production level to create a void (called a rat hole in the field) into which sand and other solids can fall and accumulate and thereby delay the time when it will become necessary to suspend oil production and bail out the well.

After the above steps of injecting the polymerization fluid and when applying the process for sand consolidation, the sodium chloride solution or brine are completed, the well should be shut in and left to stand for a period of from 1 to 4 hours and preferably at least 1 to 2 hours.

In application of either the sand consolidation, well plugging or water shut off embodiments of our invention, leaving the well shut in for more than 2 hours will have no adverse effect on the process, and indeed the strength of the polymerized resin may increase in this additional period. The set time as described herein only defines the minimum time in which polymerization of the resin will proceed to a sufficient level to prevent washing the polymer from the sand grains.

EXPERIMENTAL SECTION

A series of experiments were performed under controlled laboratory conditions to determine the concentration of various dense solvents which produced a treating fluid whose density is greater than the 9.5 pounds per gallon density of resin and hydrocarbon-solvents previously used.

Two laboratory runs were performed to evaluate the effectiveness of a treating fluid comprising "QUACORR 1300®" furan resin, acid catalyst and dense solvents.

In the first experiment, a fluid was prepared using 80 ml. of resin ("QUACORR 1300®) plus 10 ml. of tetrabromoethane and 1.0 ml. of toluene sulfonic acid. This was mixed well and allowed to remain quiescent at 140° F. for 2 hours. We observed that a strong polymerized mass was produced.

In the second test, a fluid was prepared using 80 ml. of resin, 10 ml. of furfural and 1 ml. of toluene sulfonic acid. After remaining quiescent for 2 hours at 140° F., a strong polymerized mass was produced.

FIELD EXPERIMENT

The dense solvent-containing treating fluid was used in an offshore Louisiana gravel packed well in a test of the water exclusion version of our invention. The treated zone was at a depth of 8,000 feet and the formation density was 10 pounds per gallon.

A quantity of treating fluid was prepared by mixing together 14 gallons of Furan resin with 5 gallons of bromobenzene and 4 gallons of butyl acetate. As catalyst, 0.8 gallons of toluenesulfonic acid was added as an acid catalyst.

This fluid was introduced into the zone of the formation where fluid exclusion was desired and left in the zone for 4 hours. No salt water injection was used. The result was complete shut-off of water flow into the formation from this zone. The treatment is still effective after 25 weeks.

FIELD EXAMPLE I—SAND CONSOLIDATION

For the purpose of complete disclosure, including what is now believed to be as the best mode for applying the process of our invention, the following pilot field example is supplied.

A producing well is completed in a subterranean petroleum-containing formation, the formation being from 8560 to 8588 feet. Considerable sand production has been experienced in other wells completed in this formation in the past, and so it is contemplated that some treatment must be applied in order to permit oil production from this formation without experiencing the various problems of unconsolidated sand production. The density of the formation fluid is about 10.5 pounds per gallon. This particular well has not yet been used for oil production, and so little sand has been produced from the formation. It is known that the sand is coated with formation crude, but is otherwise of a reasonable particle size to accommodate sand consolidation process using the natural sand present in the formation. It is decided therefore to inject the treating fluid of our invention into the formation immediately adjacent to the perforation of the producing well in order to bind the naturally occurring sand grains together and form a stable mass which forms a permeable barrier to restrain the flow of formation sand into the well while still permitting the free flow of formation fluids including petroleum through the barrier. It is determined that it is sufficient to treat approximately 12 inches (1 foot) into the formation. Based on experience in this field, it is expected that the porosity of the formation to be treated is approximately 40. The outside casing diameter of the well being treated is ten inches (radius =5.0 in. or 0.417 ft.). The volume of fluid necessary to treat this portion of formation is determined as follows:

$$V = (\pi(1.0 + .417)^2 - \pi(.417)^2) \times (0.40)(28)$$
$$= 64.5 \text{ Cu. Ft.}$$
$$= 482.76 \text{ Gallons}$$

In order to accomplish adequate saturation of the portion of the unconsolidated sand formation adjacent to the production well, a total of 490 gallons of resin treating fluid is required.

In order to treat this well successfully the density of the treating fluid should be at least 11.5 pounds per gallon. tetrachloroethane is selected as the dense solvent to provide the desired density.

The resin employed in this procedure is "QO-1300®" obtained from QO Chemicals, which is an oligomer of furfuryl alcohol. The 490 gallons of sand consolidation treating fluid is formulated by mixing 294 gallons of the above-described resin with 49 gallons of butyl acetate and 147 gallons of tetrachloroethane. Since the formation temperature is known to be 200° F., the desired concentration of toluenesulfonic acid is 1.0. This requires 40 pounds of toluenesulfonic acid. In order to facilitate use of toluenesulfonic acid in this application, since the surface ambient temperature is 85° F., a mixture comprising 40 pounds toluenesulfonic acid and 4.9 gallons of methanol is prepared and then added to the resin-ester-dense solvent mixture. This fluid is injected into the formation at a rate of about 900 gallons per hour. After all of the treating fluid has been injected into the formation, 500 gallons of saturated sodium chloride brine is formulated and injected into the well at the same rate to displace the treating fluid out of the injection string and to force brine through the portion of the formation into which the treating fluid has been injected, displacing a portion of the treating fluid from the void spaces in the formation thereby forming flow channels in the resin zone. This ensures that the residual permeable barrier will exhibit sufficient permeability to permit production of fluids from the well. The well is shut in and is left for a period of 2 hours, which is adequate for this particular formation temperature. At the conclusion of this shut-in soak period, the well is drilled out to remove residual resin from inside the well, and to a point 30 feet below the bottom of the perforations to create a rat hole where produced sand can settle. The well is then placed on production and essentially sand-free oil production is obtained.

FIELD EXAMPLE II—FLUID ENTRY CONTROL

A producing well is completed in a subterranean petroleum containing formation, the petroleum formation being from 8540 to 8588 feet. This zone is treated as described above to control production of unconsolidated sand. Production of oil occurs without sand but excessive salt water is being produced from a twenty three foot thick zone located thirty feet above the oil production zone. It is decided therefore to inject treatment fluid into the water producing interval of the formation in order to form an impermeable barrier to restrain the flow of water into the well. It is determined that it is sufficient to treat approximately 12 inches (1 foot) into the formation. Based on experience in this field, it is expected that the porosity of the water producing interval formation to be treated is also approximately 40. The outside casing diameter of the well being treated is ten inches (radius =5 inches or 0.417 ft.). The volume of fluid necessary to treat this portion of formation is determined as follows:

$$V = (\pi(1 + .417)^2 - \pi(.417)^2)(23)(.40)$$
$$= (5.76)(23)(.40)$$
$$= 53.0 \text{ Cu. Ft.}$$
$$= 396.6 \text{ Gallons}$$

In order to accomplish adequate saturation of the portion of the unconsolidated sand formation adjacent to the production well, a total of 397 gallons of resin treating fluid is required. The density of the formation fluid is 12 pounds per gallon, so it is desired that the treating fluid density be about 13.2 pounds per gallon. The resin employed in this procedure is the same "QO-1300 ®" described above obtained from QO Chemicals, which is an oligomer of furfuryl alcohol. The 397 gallons of treating fluid is formulated by mixing 238 gallons of the above-described resin with 40 gallons of butyl acetate and 119 gallons of 1,2,3 tribromobenzene. Since the formation temperature is known to be 200° F., the desired concentration of toluenesulfonic acid is 1.0. This requires 33 pounds of toluenesulfonic acid. In order to facilitate use of toluenesulfonic acid in this application, since the surface ambient temperature is 85° F., a mixture comprising 33 pounds toluenesulfonic acid and 4 gallons of methanol is prepared and then added to the resin-ester-dense solvent mixture. A retrievable plug is set in the well at a point just below the formation to be treated. This fluid is injected into the formation at a rate of about 900 gallons per hour. After all of the treating fluid has been injected into the formation, the well is shut in and is left for a period of 2 hours, which is adequate for this particular formation temperature. The interior of the well is drilled out to remove the hardened resin, and the retrievable plug is removed. At the conclusion of this treatment, the well is placed on production and essentially no water production is obtained from the treated zone.

FIELD EXAMPLE III—WELL PLUGGING

If the above well is to be abandoned, a treatment similar to Example II is employed, except the volume of treating fluid is increased so the well interior is filled from the bottom to the point above the top of the upper most perforations, and allowed to solidify. The residual resin in the well is not drilled out in this embodiment.

The additional volume required to fill the bottom 200 ft. of this well is $$V = \pi(.417)^2(200)$$
$$= 109.2 \text{ Cu. Ft.}$$
$$= 817 \text{ Gallons}$$

This is in addition to the 397 gallons required to seal the formation outside the perforations, so the total volume required is 1,214 gallons.

Although our invention has been described in terms of a series of specific preferred embodiments and illustrative examples which applicants believe to include the best mode for applying their invention known to them at the time of this application, it will be recognized to those skilled in the art that various modifications may be made to the composition and methods described herein without departing from the true spirit and scope of our invention which is defined more precisely in the claims appended hereinafter below.

We claim:

1. A method for treating a well penetrating a subsurface formation and in fluid communication with at least a portion of the subsurface formation, the temperature of the formation and the density of the formation fluid being known or determinable, comprising:
   (a) providing a consolidating treating fluid comprising a resin capable of being acid catalyzed to polymerize in the formation, a polar organic diluent for the resin, a predetermined concentration of dense solvent whose density is greater than the density of the resin, and a predetermined concentration of an oil soluble acid catalyst capable of causing polymerization of the resin at formation temperatures in from 1 to 24 hours, said acid having a pK in the range of 0.4 to 6.0;
   (b) injecting said fluid into the formation to enter and saturate at least a portion of the formation adjacent to the well; and
   (c) allowing the injected fluids to remain in the formation for at least four hours to accomplish at least partial polymerization of the resin, forming a polymerized resin-sand mass around the wellbore.

2. A method recited in claim 1 wherein the resin is oligomer of furfuryl alcohol.

3. A method as recited in claim 2 wherein the concentration of the furfuryl alcohol oligomer is from 40 to 80 by volume based on the total volume of the fluid.

4. A method as recited in claim 2 wherein the concentration of furfuryl alcohol oligomer is from 50 to 60 by volume based on the total volume of the fluid.

5. A method as recited in claim 1 wherein the polar organic diluent is a hydrolyzable ester.

6. A method as recited in claim 5 wherein the hydrolyzable ester is butyl acetate.

7. A method as recited in claim 5 wherein the hydrolyzable ester is ethyl acetate.

8. A method as recited in claim 5 wherein the concentration of hydrolyzable ester in the treating fluid is from 5 to 40 by volume.

9. A method as recited in claim 5 wherein the concentration of hydrolyzable ester in the treating fluid is from 10 to 20 by volume.

10. A method as recited in claim 1 wherein the dense solvent is bromobutane, bromobenzene, furfural, tetrachloroethane, tetrachloroethylene, tetrabromoethane, 1,2,4 trichlorbenzene, 1,2,3 tribromopropane or mixtures thereof.

11. A method as recited in claim 10 wherein the dense solvent is bromobutane.

12. A method as recited in claim 10 wherein the dense solvent is bromobenzene.

13. A method as recited in claim 10 wherein the dense solvent is furfural.

14. A method as recited in claim 10 wherein the dense solvent is tetrachloroethane.

15. A method as recited in claim 10 wherein the dense solvent is tetrabromoethane.

16. A method as recited in claim 10 wherein the dense solvent is 1,2,4 trichlorobenzene.

17. A method as recited in claim 10 wherein the dense solvent is tetrabromomethane.

18. A method as recited in claim 10 wherein the dense solvent is 1,2,3 tribromopropane.

19. A method as recited in claim 1 wherein the concentration of dense solvent is sufficient to raise the treating fluid density to a value greater than the density of the formation fluid.

20. A method as recited in claim 19 herein the concentration of dense solvent is sufficient to raise the density of the treating fluid to a value which is at least 10 greater than the density of the formation fluid.

21. A method as recited in claim 19 wherein the concentration of dense solvent is from 5 to 40.

22. A method as recited in claim 19 wherein the concentration of dense solvent is from 10 to 20.

23. A method as recited in claim 19 wherein the concentration of dense solvent is sufficient to raise the density of the treating fluid to a value of at least 10 pounds per gallon.

24. A method as recited in claim 1 wherein the concentration of the acid catalyst is selected to cause polymerization of the polymerizable resin at the formation temperature in from 1 to 4 hours.

25. A method as recited in claim 24 wherein the concentration of acid catalyst is from 0.2 to 5.0 by volume.

26. A method as recited in claim 24 wherein the concentration of acid catalyst is from 0.40 to 4.0 by volume.

27. A method as recited in claim 24 wherein the aqueous fluid is a sodium chloride brine.

28. A method as recited in claim 1 comprising the additional steps of injecting after the consolidating treating fluid has been injected, a second aqueous fluid comprising water and an inorganic salt, into the same portion of the formation as the consolidating treating fluid, to establish permeability in the treated portion of the formation.

29. A method as recited in claim 27 wherein the sodium chloride brine is at least 70 saturated.

30. A method as recited in claim 27 wherein the aqueous fluid is saturated sodium chloride brine.

31. A method as recited in claim 28 wherein the volume of second aqueous fluid injected into the formation after injecting the consolidating treating fluid is about equal to the volume of said consolidating treating fluid used.

32. A method as recited in claim 1 wherein the resin-containing fluid is prepared by dissolving catalyst in the polar organic diluent and then mixing with the resin.

33. A method as recited in claim 1 wherein the volume of consolidating treating fluid injected into the formation is sufficient to saturate the pore space of the formation adjacent to the producing well for a distance up to 12 inches from the well.

34. A method as recited in claim 1 comprising the additional step of pre-dissolving the acid catalyst in a diluent comprising a low molecular weight alcohol prior to mixing it with the polymerizable resin and diluent.

35. A method as recited in claim 34 wherein the low molecular weight alcohol is methanol.

36. A method as recited in claim 34 wherein the concentration of the low molecular weight alcohol in the mixture of alcohol and acid catalyst is from 1 to 5 by weight.

37. A method as recited in claim 1 comprising the step of injecting sufficient resin-containing fluid to saturate the formation for a distance up to one (1) foot from the well plus sufficient additional fluid to fill the well interior for a predetermined distance to prepare the well for abandonment.

* * * * *

UNITED STATES PATENT AND TRADEMARK OFFICE
CERTIFICATE OF CORRECTION

PATENT NO. : 5,293,939
DATED : March 15, 1994
INVENTOR(S) : Billy W. Surles and Phillip D. Fader It is certified that error appears in the above-identified patent and that said Letters Patent is hereby corrected as shown below:

Title page, item [73], for Assignee please substitute --Texaco Inc. -- for "Texaco Chemical Company".

Signed and Sealed this

Twelfth Day of August, 1997

Attest:

BRUCE LEHMAN

Attesting Officer

Commissioner of Patents and Trademarks